Nov. 9, 1971   R. E. ROSE   3,618,388

CONTROL APPARATUS

Filed May 5, 1969

INVENTOR.
RAYMOND E. ROSE

BY Bruce C Lutz

ATTORNEY

United States Patent Office 3,618,388
Patented Nov. 9, 1971

3,618,388
CONTROL APPARATUS
Raymond E. Rose, Roseville, Minn., assignor to
Honeywell Inc., Minneapolis, Minn.
Filed May 5, 1969, Ser. No. 821,821
Int. Cl. G01l 7/00
U.S. Cl. 73—388
10 Claims

ABSTRACT OF THE DISCLOSURE

The method of and apparatus for measuring free stream static pressure of a fluid at both subsonic and supersonic speeds, regardless of the shape of the vessel to which the apparatus is attached, wherein the static pressure is measured within a hollow tube through which the fluid passes. The position of normal shock within the tube is controlled by varying the size or number of the outlets in the tube. The free stream static pressure is thus determined by utilizing known relationships between the actual free stream static pressure and the measured static pressure for that approximate speed. The approximate speed is measured by a separate sensor which may be a part of or separate from the tube.

This invention pertains generally to sensing apparatus and more particularly to apparatus for sensing the free stream static pressure of a fluid at subsonic and supersonic speeds.

In the prior art, it is common to utilize a total pressure sensor in a probe with a static pressure sensor on an external portion of the probe. The measurement of static pressure is obtained by making wind tunnel tests of the probe attached to the vessel on which it is to be used, or a model thereof. Measurements are recorded of indicated and actual static pressure for each of many different speeds. These tests are necessary because vessel configuration may influence indicated pressures by changing the air flow patterns. This information is then used in a computer to compensate for the inaccurate static pressure measurements. The inaccuracies arise from various factors such as pressure feedback through the boundary layer and shock waves which can drastically change the measured static pressure. The magnitude of the inaccuracies depends upon the vessel configuration and its proximity to the static pressure sensor.

The present invention, on the other hand, maintains the position of the shock wave and measures the static pressure internal to a hollow probe. Thus, the shape of the aircraft has no effect on the action or flow patterns of the fluid flowing past the static pressure sensor. If the probe is improperly designed such that there are adverse boundary layer effects near the probe inlet that cause an internal oblique shock when the shock wave is swallowed, the effect can be compensated for by measuring this effect at different speeds. Given this information, the particular probe can still be used on any vehicle and does not have to be recalibrated for each different vehicle as in the prior art. In this last described situation, the shock wave is behind the static pressure sensor and the measured static pressure is the true free stream static pressure for a properly designed inlet. With proper design of the probe, compensation is needed only when the normal shock is located at the foremost portion of the probe, in which event compensation is required because the static pressure is being measured behind the shock wave.

It is therefore an object of this invention to provide an improved static pressure measuring means.

Other objects and advantages of the present invention will be apparent from a reading of the specification and appended claims in conjunction with the drawings wherein:

Figure 1:
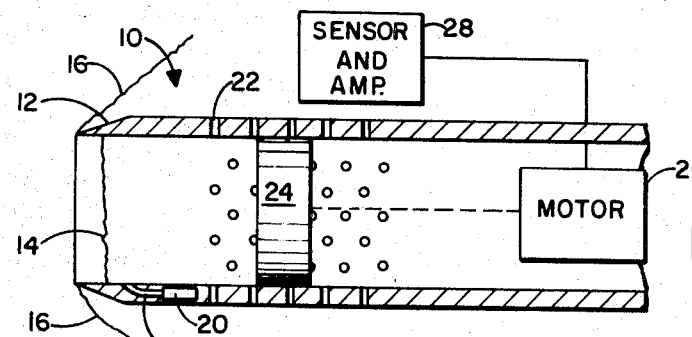
FIG. 1 illustrates a tubular probe having holes or perforations in the wall thereof, and wherein a servoed piston is used to vary the total effective discharge area to hold the normal shock upstream of the static pressure sensing means.

In FIG. 1, a hollow cylindrical probe generally designated as 10 and shown in cross-section, has a lip portion 12 with sloping sides on the exterior surface and with straight sides on the interior surface. Immediately behind the front opening of and internal to the probe 10 there is shown or illustrated by a wavy line a normal shock portion 14 of a shock wave. The rest of the shock wave is identified by numeral 16 extending from the lip 12.

While with a normal blunt object the shock wave stands away from and is curved around the front of the object when it is traveling at speeds in excess of sonic speeds, with the design shown and with the allowance of air flow through the probe, a normal shock portion 14 can occur interior to the probe 10.

Downstream of normal shock portion 14 there is shown a tube or static pressure sensing means 18 extending to the interior surface of the probe 10 and terminating in a sensing element 20 which transmits information to a load. This transmission of information may be by electronic, fluidic or other means. Many holes or perforations are shown in the surface of the probe 10 rearward or downstream of the static pressure sensing means 18. These holes or discharge means are generally identified by numeral 22. A piston 24 is operated by a motor 26 and, as shown, is positioned approximately midway in the discharge area of the probe 10. A further sensor 28 for measuring total pressure is located exterior the probe 10, and in conjunction with an amplifier, supplies signal information to motor 26 to position the piston 24.

It is apparent that the piston 24 must be adjusted with speed and total pressure changes in order to allow the air flow through the probe and out the holes 22 to maintain the normal shock 14 at a given point upstream from sensor 18.

Figure 2:
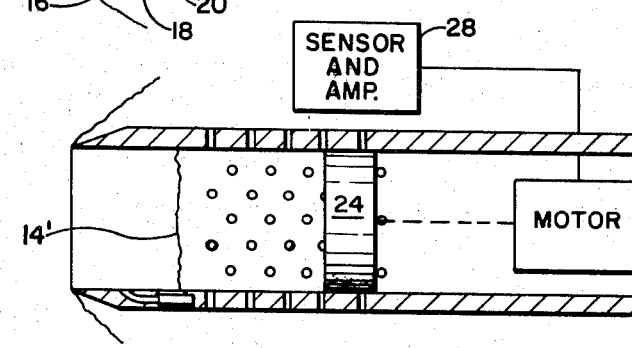
FIG. 2 illustrates the probe of FIG. 1 with the piston positioned to hold the normal shock downstream of the static pressure sensing means.

In FIG. 2, the same numerical identifications as in FIG. 1 are given the various parts, except that the normal shock portion is designated as 14', illustrating that it is now downstream from probe 18, rather than upstream therefrom. Since the piston 24 is merely repositioned in accordance with a new calibration scheme, the remaining designations are kept the same.

Figure 3:
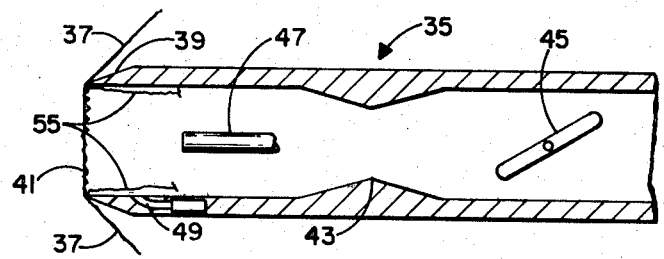
FIG. 3 illustrates another embodiment shown in an operating condition similar to that of FIG. 1.

In FIG. 3, a different probe configuration generally identified by numeral 35 is shown producing a shock wave 37 emanating from a sloped lip 39 on the forward portion of the probe. A normal shock 41 is produced at the forward portion of the probe 35. The interior walls of the probe 35 are parallel to the direction of travel for a distance as shown. They then converge to a point and then diverge to the same diameter as at the forward portion of the probe 35 to form a restriction, throat, constriction or diffuser 43. The reason for this configuration will be apparent from a discussion of FIG. 4. Posterior the portion 43 there is a valve 45 which may be operated to change the amount of fluid flow through the probe 35 to some type of pump or other fluid sink. In a portion anterior to the restriction 43 there is a total pressure sensor 47. Between pressure sensor 47 and the lip 39 is a static pressure sensor 49. This may be constructed in a manner similar to that shown in FIG. 1 or may be any other type of static pressure sensor for providing an output signal having desired characteristics. All that is required of sensor 49 is that it sense static pressure on the interior of the probe. Accordingly, a major portion of the sensor can be built on the exterior of the probe if this is desirable. Since the exterior of the probe at this point has no effect on the normal shock, such a configuration will cause no airflow problems affecting the measurement. In operation the total pressure sensor 47 provides an indication of approximate speed of the vehicle, which in turn controls the position of the valve 45 to control the position of the normal shock 41.

Figure 4:
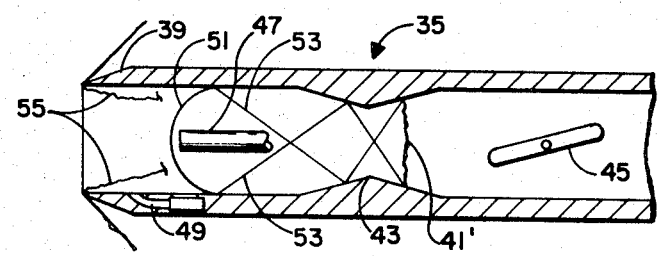
FIG. 4 illustrates the embodiment of FIG. 3 shown in an operating condition similar to that of FIG. 2.

FIG. 4 is a drawing similar to that of FIG. 3 using the same numerical designations, except that the normal shock portion which is positioned or maintained immediately downstream from constriction 43 is labeled 41'. As will be observed, the valve 45 is in a less restrictive position to allow more air flow through the probe 35 and thus allow the normal shock to be swallowed. The reason for the constriction 43 is to provide more stable control of the position of the normal shock in the swallowed condition. (This is a standard procedure for stabilizing a normal shock in a duct.) As will be further noted, since the normal shock is now downstream from sensor 47, a bow shock wave 51 occurs due to the sensor. Reflected shock waves 53 produced by sensor 47 culminate in the normal shock 41' as illustrated. As will be further noted, static pressure sensor 49 in FIG. 4 is upstream from any shock waves, and thus senses actual free stream static pressure for a properly designed inlet. It is realized that with some design there may be minor boundary layer effects, as indicated by lines 55, which may tend to produce errors in measured static pressure. However, as mentioned previously, these can be calculated or measured on a one-time only basis for a particular probe and speed, and will remain the same for that speed, regardless of the configuration of the vessel to which the probe is attached.

Figure 5:
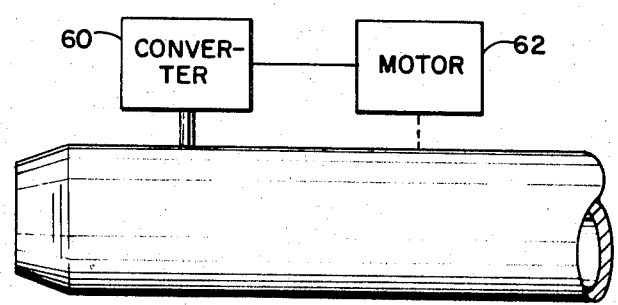
FIG. 5 shows the probe of FIGS. 3 and 4 with apparatus for adjusting air flow.

In FIG. 5, the probe 35 is shown with a converter 60 which obtains the total pressure from total pressure sensor 47, and converts it to an electrical signal to actuate a motor 62 which in turn positions valve 45 (shown in FIGS. 3 and 4) in accordance with the approximate actual speed. To obtain more accurate information, the indicated static pressure may also be utilized in a feedback system used with converter 60 to more accurately ascertain actual speed as is typical in prior art air data computers.

From the above description, it will be apparent that the operation of the present invention is typical of a conventional servo mechanism system. In other words, in a preferred embodiment the speed of the probe is sensed and the piston 24 or the valve 45 is adjusted to keep the normal shock 14 or 41 at a position upstream from the static pressure sensor. In an alternate embodiment, the piston 24 or valve 45 is adjusted to keep the normal shock 14' or 41' downstream from the static pressure sensor. When the normal shock is upstream from the pressure sensor, there are known conversion factors, as published by NASA, which may be used to convert from the measured static pressure to the actual free stream static pressure at any given relative speed of the probe with respect to the fluid environment. When the normal shock is downstream from the static pressure sensor, the measured static pressure is the actual free stream static presure unless adversely affected by boundary layer conditions. Under such adverse conditions the required compensation can be easily determined by making measurements at the various speeds in a wind tunnel or under other controlled conditions. From then on, the same compensation can be used, regardless of the vessel to which the probe is attached. As also mentioned above, the measured static pressure can be utilized in a feedback relationship with the total pressure sensor to obtain a very accurate indication of speed, rather than an approximate indication, to even more accurately hold the normal shock at a given position.

Other embodiments for practicing the basic invention of controlling the position of the normal shock which is swallowed by a probe such that static pressure there within can be accurately measured will be apparent to those skilled in the art. I, therefore, wish to be limited only by the scope of the appended claims, wherein I claim:

1. A method for determining free stream static pressure of an ambient fluid by means of a tubular probe having velocity along its longitudinal axis relative to the fluid, the velocity ranging over subsonic and supersonic values, the probe being configured to permit fluid flow therethrough and, at supersonic relative velocities, to generate a shock wave having a normal shock portion whose location may vary within the probe, the method comprising the steps of:
sensing static fluid pressure at a predetermined portion of an interior wall of the probe; and
automatically varying mass fluid flow through the probe of flow control means downstream from said predetermined portion of the interior wall so as to maintain the normal shock portion at a predetermined location relative to said predetermined portion, thereby eliminating variations in the sensed static pressure which would otherwise result from movement of the normal shock portion.

2. The method of claim 1 wherein the step of automatically varying mass fluid flow through the probe comprises the further steps of:
sensing total pressure of the ambient fluid relative to the probe; and
automatically varying mass fluid flow through the probe in response to the sensed total pressure.

3. The method of claim 2 wherein the normal shock portion is maintained at a location upstream from the predetermined portion of the interior wall, and wherein the sensed static fluid pressure is converted to actual free stream static pressure according to a predetermined function.

4. The method of claim 2 wherein the location of the normal shock portion is maintained downstream from the predetermined portion of the interior wall, the sensed static pressure being the actual free stream static pressure.

5. Apparatus for determining free stream static pressure of an ambient fluid relative to which the apparatus has velocity which may range over subsonic and supersonic values, the apparatus comprising:
a tubular probe generally aligned with the direction of its relative velocity, said tubular probe being configured to permit flow of the fluid therethrough and, at supersonic velocities, to generate a shock wave having a normal shock portion whose location may vary within the probe;
static pressure sensing means located to sense static fluid pressure at a predetermined portion of an interior wall of said tubular proble;
variable flow control means for regulating mass fluid flow through said tubular probe in response to a control signal, said variable flow control means being located downstream from said predetermined portion of the interior wall;
signal generating means for automatically producing the control signal required to cause said variable flow control means to regulate fluid flow through said tubular probe so as to maintain the normal shock portion at a predetermined location relative to the predetermined portion of the interior wall; and
means connecting said signal generating means to said variable flow control means so as to convey the control signal thereto, thereby maintaining the normal shock portion at the predetermined location and eliminating variations in the sensed static pressure which would otherwise result from movement of the normal shock portion.

6. The apparatus of claim 5 wherein said signal generating means comprises total pressure sensing means for sensing total pressure of the ambient fluid, the control signal produced by said signal generating means being indicative of the sensed total pressure.

7. The apparatus of claim 6 wherein:
the wall of said tubular probe is provided with perforations distributed along a portion of the length thereof; and
said variable flow control means includes a piston within said tubular probe axially moveable along its length so as to effectively vary the number of perforations in the wall of said tubular probe.

8. The apparatus of claim 7 wherein said variable flow control means and said total pressure sensing means maintain the normal shock portion at a location downstream from the predetermined portion of the interior wall of said tubular probe.

9. The apparatus of claim 6 wherein said tubular probe means includes a throat for stabilizing the location of the normal shock portion.

10. The apparatus of claim 9 wherein said variable flow control means includes a vane rotatable about an axis transverse to said tubular probe and located downstream from the throat thereof.

References Cited

UNITED STATES PATENTS 3,043,142   7/1962   Eiland, Jr. et al. _ _ _ _ _ _ 73—212

DONALD O. WOODIEL, Primary Examiner

U.S. Cl. X.R.

73—182, 212